United States Patent
Quan

(10) Patent No.: US 12,044,782 B2
(45) Date of Patent: Jul. 23, 2024

(54) METHODS AND APPARATUSES FOR ACQUIRING AND PROVIDING POSITIONING ASSISTANT DATA, AND DEVICES

(71) Applicant: DATANG MOBILE COMMUNICATIONS EQUIPMENT CO., LTD., Beijing (CN)

(72) Inventor: Haiyang Quan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 668 days.

(21) Appl. No.: 17/268,574

(22) PCT Filed: Sep. 20, 2019

(86) PCT No.: PCT/CN2019/106931
§ 371 (c)(1),
(2) Date: Feb. 15, 2021

(87) PCT Pub. No.: WO2020/057630
PCT Pub. Date: Mar. 26, 2020

(65) Prior Publication Data
US 2021/0286085 A1 Sep. 16, 2021

(30) Foreign Application Priority Data

Sep. 20, 2018 (CN) .......................... 201811102324.0

(51) Int. Cl.
*G01S 19/25* (2010.01)
*G01S 5/02* (2010.01)
(Continued)

(52) U.S. Cl.
CPC ............ *G01S 19/25* (2013.01); *G01S 5/0236* (2013.01); *G01S 19/05* (2013.01); *H04W 64/00* (2013.01); *H04W 4/029* (2018.02); *H04W 4/06* (2013.01)

(58) Field of Classification Search
CPC ........ G01S 19/25; G01S 19/05; G01S 5/0236; G01S 5/0027; G01S 5/0036; G01S 19/48;
(Continued)

(56) References Cited

U.S. PATENT DOCUMENTS 6,600,917 B1 * 7/2003 Maupin .................. H04W 48/16
455/414.1
7,123,928 B2 * 10/2006 Moeglein .............. G01S 5/0236
455/456.3
(Continued)

FOREIGN PATENT DOCUMENTS

CN 102137332 A 7/2011
CN 106646351 A 5/2017
(Continued)

OTHER PUBLICATIONS

First Office Action from Korean Patent Application 10-2021-7010422 issued on Jun. 30, 2022 with English translation by Global Dossier.
(Continued)

*Primary Examiner* — Olumide Ajibade Akonai
(74) *Attorney, Agent, or Firm* — Ladas & Parry, LLP

(57) ABSTRACT

The present disclosure provides methods and apparatus for acquiring and providing positioning assistant data, and devices. The method includes: acquiring positioning related information transmitted by the network side device through broadcasting, the positioning related information being used to indicate the positioning assistant data capable of being supported to be issued by the network side device; trans-
(Continued)

mitting a positioning information request to the network side device, the positioning information request including data information about target positioning assistant data requested to be acquired by the UE, and a data type of the positioning assistant data capable of being supported to be issued by the network side device including a data type of the target positioning assistant data; and receiving the target positioning assistant data from the network side device.

20 Claims, 5 Drawing Sheets

(51) Int. Cl.
  *G01S 19/05* (2010.01)
  *H04W 4/029* (2018.01)
  *H04W 4/06* (2009.01)
  *H04W 64/00* (2009.01)
(58) Field of Classification Search
  CPC ....... H04W 64/00; H04W 4/029; H04W 4/20; H04W 4/02; H04W 4/025
  See application file for complete search history.

(56) References Cited

U.S. PATENT DOCUMENTS

| | | | |
|---|---|---|---|
| 9,435,874 B2* | 9/2016 | Edge | G01S 5/0018 |
| 2002/0072378 A1* | 6/2002 | Gaal | G01S 5/0045 |
| | | | 455/433 |
| 2009/0111462 A1* | 4/2009 | Krinsky | H04W 4/029 |
| | | | 455/423 |
| 2009/0143076 A1* | 6/2009 | Wachter | G01S 5/0236 |
| | | | 455/456.1 |
| 2009/0228209 A1* | 9/2009 | Alanen | G01S 19/05 |
| | | | 701/472 |
| 2011/0098057 A1 | 4/2011 | Edge et al. | |
| 2012/0044107 A1* | 2/2012 | Huang | G01S 19/05 |
| | | | 342/357.42 |
| 2014/0162693 A1* | 6/2014 | Wachter | H04W 4/021 |
| | | | 455/456.3 |
| 2015/0189591 A1 | 7/2015 | Koc et al. | |
| 2017/0223492 A1 | 8/2017 | Bitra et al. | |
| 2018/0063680 A1* | 3/2018 | Bitra | G01S 5/02521 |
| 2018/0199160 A1 | 7/2018 | Edge | |
| 2019/0268725 A1* | 8/2019 | Edge | H04W 64/00 |
| 2020/0084586 A1* | 3/2020 | Rydén | H04W 76/40 |

FOREIGN PATENT DOCUMENTS

| | | |
|---|---|---|
| EP | 1289331 A2 | 3/2003 |
| WO | 2010124011 A2 | 10/2010 |

OTHER PUBLICATIONS

Extended European Search Report from EP app. No. 19862548.5, dated Oct. 19, 2021, all pages.
International Search Report from PCT/CN2019/106931, dated Dec. 18, 2019, with English translation from WIPO.
Written Opinion of the International Searching Authority from PCT/CN2019/106931, dated Dec. 19, 2019, with English translation from WIPO.
International Preliminary Report on Patentability from PCT/CN2019/106931, dated Mar. 23, 2021, with English translation from WIPO.

* cited by examiner

METHODS AND APPARATUSES FOR ACQUIRING AND PROVIDING POSITIONING ASSISTANT DATA, AND DEVICES

CROSS-REFERENCE TO RELATED APPLICATIONS

The present application is the U.S. national phase of PCT Application No. PCT/CN2019/106931 filed on Sep. 20, 2019, which claims a priority of the Chinese patent application 201811102324.0 filed on Sep. 20, 2018, the disclosures of which are incorporated herein by reference in their entireties.

TECHNICAL FIELD

The present disclosure relates to the field of wireless communication technology, in particular to methods and apparatuses for acquiring and providing positioning assistant data, and devices.

BACKGROUND

Location Based Services (LBS) is a service for acquiring position information about a terminal via a wireless communication network or any other positioning system and then providing various information related to a position to a user in combination with a Geographic Information System (GIS), and now a Global Navigation Satellite System (GNSS)-based outdoor positioning technology has been widely applied in various fields, e.g., a mobile terminal.

Currently, when positioning through an Auxiliary-Global Navigation Satellite System (A-GNSS), the mobile terminal needs to receive positioning assistant data from a network side, so as to assist positioning measurement and/or positioning calculation. In a Long Term Evolution (LTE) system, the positioning assistant data is provided mainly in the following two modes. In a first mode, the positioning assistant data is issued to the terminal in a connected state through dedicated LTE Positioning Protocol (LPP) signaling. In a second mode, the positioning assistant data is issued via a Positioning System Information Block (PosSIB) to the terminal in an idle state or a non-connected state through Radio Resource Control (RRC) broadcasting.

However, when the positioning assistant data is transmitted to the terminal in the idle or non-connected state through RRC broadcasting, a continuous broadcasting operation may occupy a large quantity of system resources. When there are few positioning users or even no positioning user in a cell, a waste of huge resources may occur.

SUMMARY

An object of the present disclosure is to provide methods and apparatuses for acquiring and providing positioning assistant data, and devices, so as to solve the problem in the related art where a waste of system resources occurs when the positioning assistant data is continuously transmitted to a terminal through broadcasting.

In one aspect, the present disclosure provides in some embodiments a method for acquiring positioning assistant data, for a User Equipment (UE), including: acquiring positioning related information transmitted by a network side device through broadcasting, the positioning related information being used to indicate the positioning assistant data capable of being supported to be issued by the network side device; transmitting a positioning information request to the network side device, the positioning information request including data information about target positioning assistant data requested to be acquired by the UE, and a data type of the positioning assistant data capable of being supported to be issued by the network side device including a data type of the target positioning assistant data; and receiving the target positioning assistant data from the network side device.

In some possible embodiments of the present disclosure, subsequent to acquiring the positioning related information transmitted by the network side device through broadcasting, the method further includes determining the target positioning assistant data in accordance with the positioning assistant data capable of being supported to be issued by the network side device.

In some possible embodiments of the present disclosure, the positioning related information includes basic information about a GNSS capable of being supported by the network side device, and the basic information about the GNSS is used to indicate the positioning assistant data capable of being issued.

In some possible embodiments of the present disclosure, in the acquiring the positioning related information transmitted by the network side device through broadcasting, the positioning related information is further used to indicate a transmission mode of the positioning information request transmitted by the UE to the network side device, and the transmitting the positioning information request to the network side device includes transmitting the positioning information request to the network side device in accordance with the transmission mode indicated in the positioning related information.

In some possible embodiments of the present disclosure, the transmission mode is a mode where the positioning information request is transmitted through an RRC message or preamble.

In some possible embodiments of the present disclosure, when the transmission mode is a mode where the positioning information request is transmitted through the preamble, the positioning related information is further used to indicate preambles corresponding to the positioning assistant data of different types.

In another aspect, the present disclosure provides in some embodiments a method for providing positioning assistant data for a network side device, including: transmitting positioning related information to a UE through broadcasting, the positioning related information being used to indicate the positioning assistant data capable of being issued by the network side device; receiving a positioning information request from the UE, the positioning information request includes data information about target positioning assistant data requested to be acquired by the UE; when the network side device is capable of providing the target positioning assistant data, transmitting the target positioning assistant data to the UE; and when the network side device is incapable of providing the target positioning assistant data, transmitting a request message for acquiring the target positioning assistant data to a location management server.

In some possible embodiments of the present disclosure, the method further includes: acquiring the target positioning assistant data from the location management server; and transmitting the target positioning assistant data to the UE through broadcasting.

In some possible embodiments of the present disclosure, the positioning related information includes basic information about a GNSS capable of being supported by the network side device, and the basic information about the GNSS is used to indicate the positioning assistant data capable of being issued.

In some possible embodiments of the present disclosure, in the transmitting the positioning related information to the UE through broadcasting, the positioning related information is further used to indicate a transmission mode of the positioning information request transmitted by the UE to the network side device, and the receiving the positioning information request from the UE includes receiving the positioning information request transmitted by the UE to the network side device in accordance with the transmission mode indicated in the positioning related information.

In some possible embodiments of the present disclosure, the transmission mode is a mode where the positioning information request is transmitted through an RRC message or preamble.

In some possible embodiments of the present disclosure, when the transmission mode is a mode where the positioning information request is transmitted through the preamble, the positioning related information is further used to indicate preambles corresponding to the positioning assistant data of different types.

In some possible embodiments of the present disclosure, the transmitting the request message for acquiring the target positioning assistant data to the location management server includes transmitting the request message to the location management server through a New Radio Positioning Protocol Annex (NRPPa) message.

In yet another aspect, the present disclosure provides in some embodiments a method for providing positioning assistant data for a location management server, including: acquiring a request message for acquiring target positioning assistant data from a network side device; and transmitting the target positioning assistant data to the network side device in accordance with the request message.

In some possible embodiments of the present disclosure, the acquiring the request message for acquiring the target positioning assistant data from the network side device includes acquiring the request message transmitted by the network side device through an NRPPa message, and the transmitting the target positioning assistant data to the network side device includes transmitting the target positioning assistant data to the network side device through the NRPPa message.

In still yet another aspect, the present disclosure provides in some embodiments a UE, including a memory, a processor, and a program stored in the memory and executed by the processor. The processor is configured to execute the program so as to: acquire positioning related information transmitted by a network side device through broadcasting, the positioning related information being used to indicate the positioning assistant data capable of being supported to be issued by the network side device; transmit a positioning information request to the network side device, the positioning information request including data information about target positioning assistant data requested to be acquired by the UE, and a data type of the positioning assistant data capable of being supported to be issued by the network side device including a data type of the target positioning assistant data; and receive the target positioning assistant data from the network side device.

In some possible embodiments of the present disclosure, the processor is further configured to determine the target positioning assistant data in accordance with the positioning assistant data capable of being supported to be issued by the network side device.

In some possible embodiments of the present disclosure, the positioning related information includes basic information about a GNSS capable of being supported by the network side device, and the basic information about the GNSS is used to indicate the positioning assistant data capable of being issued.

In some possible embodiments of the present disclosure, the positioning related information is further used to indicate a transmission mode of the positioning information request transmitted by the UE to the network side device, and the processor is further configured to transmit the positioning information request to the network side device in accordance with the transmission mode indicated in the positioning related information.

In some possible embodiments of the present disclosure, the transmission mode is a mode where the positioning information request is transmitted through an RRC message or preamble.

In some possible embodiments of the present disclosure, when the transmission mode is a mode where the positioning information request is transmitted through the preamble, the positioning related information is further used to indicate preambles corresponding to the positioning assistant data of different types.

In still yet another aspect, the present disclosure provides in some embodiments a network side device, including a memory, a processor, and a program stored in the memory and executed by the processor. The processor is configured to execute the program, so as to: transmit positioning related information to a UE through broadcasting, the positioning related information being used to indicate the positioning assistant data capable of being issued by the network side device; receive a positioning information request from the UE, the positioning information request includes data information about target positioning assistant data requested to be acquired by the UE; when the network side device is capable of providing the target positioning assistant data, transmit the target positioning assistant data to the UE; and when the network side device is incapable of providing the target positioning assistant data, transmit a request message for acquiring the target positioning assistant data to a location management server.

In some possible embodiments of the present disclosure, the processor is further configured to: acquire the target positioning assistant data from the location management server; and transmit the target positioning assistant data to the UE through broadcasting.

In some possible embodiments of the present disclosure, the positioning related information includes basic information about a GNSS capable of being supported by the network side device, and the basic information about the GNSS is used to indicate the positioning assistant data capable of being issued.

In some possible embodiments of the present disclosure, when the positioning related information is transmitted by the processor to the UE through broadcasting, the positioning related information is further used to indicate a transmission mode of the positioning information request transmitted by the UE to the network side device, and the processor is further configured to receive the positioning information request transmitted by the UE to the network side device in accordance with the transmission mode indicated in the positioning related information.

In some possible embodiments of the present disclosure, the transmission mode is a mode where the positioning information request is transmitted through an RRC message or preamble.

In some possible embodiments of the present disclosure, when the transmission mode is a mode where the positioning information request is transmitted through the preamble, the positioning related information is further used to indicate preambles corresponding to the positioning assistant data of different types.

In some possible embodiments of the present disclosure, the processor is further configured to transmit the request message to the location management server through an NRPPa message.

In still yet another aspect, the present disclosure provides in some embodiments a location management server, including a memory, a processor, and a program stored in the memory and executed by the processor. The processor is configured to execute the program, so as to: acquire a request message for acquiring target positioning assistant data from a network side device; and transmit the target positioning assistant data to the network side device in accordance with the request message.

In some possible embodiments of the present disclosure, the processor is further configured to acquire the request message transmitted by the network side device through an NRPPa message, and when transmitting the target positioning assistant data to the network side device, the processor is further configured to transmit the target positioning assistant data to the network side device through the NRPPa message.

In still yet another aspect, the present disclosure provides in some embodiments an apparatus for acquiring positioning assistant data for a UE, including: an information acquisition module configured to acquire positioning related information transmitted by a network side device through broadcasting, the positioning related information being used to indicate the positioning assistant data capable of being supported to be issued by the network side device; a first request module configured to transmit a positioning information request to the network side device, the positioning information request including data information about target positioning assistant data requested to be acquired by the UE, and a data type of the positioning assistant data capable of being supported to be issued by the network side device including a data type of the target positioning assistant data; and a first reception module configured to receive the target positioning assistant data from the network side device.

In still yet another aspect, the present disclosure provides in some embodiments an apparatus for providing positioning assistant data for a network side device, including: a first transmission module configured to transmit positioning related information to a UE through broadcasting, the positioning related information being used to indicate the positioning assistant data capable of being issued by the network side device; a second reception module configured to receive a positioning information request from the UE, the positioning information request includes data information about target positioning assistant data requested to be acquired by the UE; a second transmission module configured to, when the network side device is capable of providing the target positioning assistant data, transmit the target positioning assistant data to the UE; and a second request module configured to, when the network side device is incapable of providing the target positioning assistant data, transmit a request message for acquiring the target positioning assistant data to a location management server.

In still yet another aspect, the present disclosure provides in some embodiments an apparatus for providing positioning assistant data for a location management server, including: a third reception module configured to receive a request message for acquiring target positioning assistant data from a network side device; and a third transmission module configured to transmit the target positioning assistant data to the network side device in accordance with the request message.

In still yet another aspect, the present disclosure provides in some embodiments a computer-readable storage medium storing therein a program. The program is executed by a processor so as to implement the steps of the above-mentioned method for acquiring the positioning assistant data, or implement the steps of the above-mentioned method for providing the positioning assistant data.

According to the method for acquiring the positioning assistant data in the embodiments of the present disclosure, the network side device may indicate, through broadcasting, the positioning assistant data capable of being supported to be issued, so that the UE may acquire the type of the positioning assistant data capable of being supported to be issued by the network side device, and transmit the request information to the network side device on its own initiative, so as to acquire the desired target positioning assistant data. As a result, it is able for the UE to transmit the request for acquiring the positioning assistant data on its own initiative, so as to prevent the network side device from transmitting the positioning assistant data continuously, thereby to prevent a waste of resources and reduce a network overhead.

DETAILED DESCRIPTION

In order to make the objects, the technical solutions and the advantages of the present disclosure more apparent, the present disclosure will be described hereinafter in a clear and complete manner in conjunction with the drawings and embodiments.

A method for acquiring positioning assistant data and a method for providing positioning assistant data in the embodiments of the present disclosure may be applied to various communication systems, e.g., a current communication system such as Global System of Mobile communication (GSM), Code Division Multiple Access (CDMA) system, Wideband Code Division Multiple Access (WCDMA) system, General Packet Radio Service (GPRS), Long Term Evolution (LTE) system or Universal Mobile Telecommunication System (UMTS), or a future $5^{th}$-Generation (5G) system.

Figure 1:
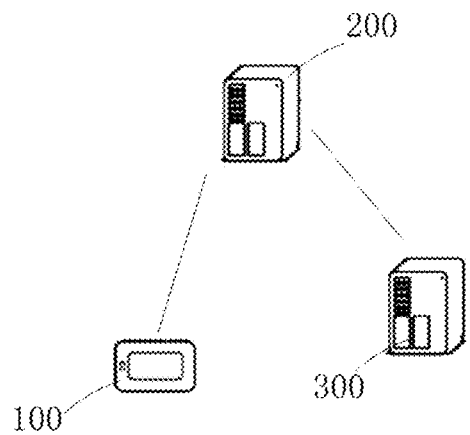
FIG. 1 is a schematic view showing architecture of a system according to some embodiments of the present disclosure.

FIG. 1 shows a possible scenario where the method for acquiring the positioning assistant data and the method for providing the positioning assistant data are applied. As shown in FIG. 1, a wireless communication system using the method for acquiring the positioning assistant data and the method for providing the positioning assistant data includes a UE 100, a network side device 200, and a location management server 300. The location management server 300 is configured to provide a location management function. The network side device 200 is connected to a core network, and configured to provide positioning measurement information or positioning reference information to the UE 100, and exchange positioning related information with the location management server 300. In some possible embodiments of the present disclosure, the network side device 200 may be a Radio Access Network (RAN) node device.

In the embodiments of the present disclosure, the UE 100 may be an access terminal, a user unit, a user station, a mobile station, a mobile, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or any other processing device connected to a wireless modem, a vehicle-mounted device, a wearable device, a user device in a future 5G network, or a user device in a future evolved Public Land Mobile Network (PLMN), which will not be particularly defined herein.

In order to solve the problem in the related art where a waste of system resources occurs when the positioning assistant data is continuously transmitted to a terminal through broadcasting, the present disclosure provides in some embodiments a method for acquiring positioning assistant data. The network side device may indicate, through broadcasting, the positioning assistant data capable of being supported to be issued, so that a UE may acquire a type of the positioning assistant data capable of being supported to be issued by the network side device, and transmit request information to the network side device on its own initiative, so as to acquire desired target positioning assistant data. As a result, it is able for the UE to transmit a request for acquiring the positioning assistant data on its own initiative, so as to prevent the network side device from transmitting the positioning assistant data continuously, thereby to prevent a waste of resources and reduce a network overhead.

Figure 2:
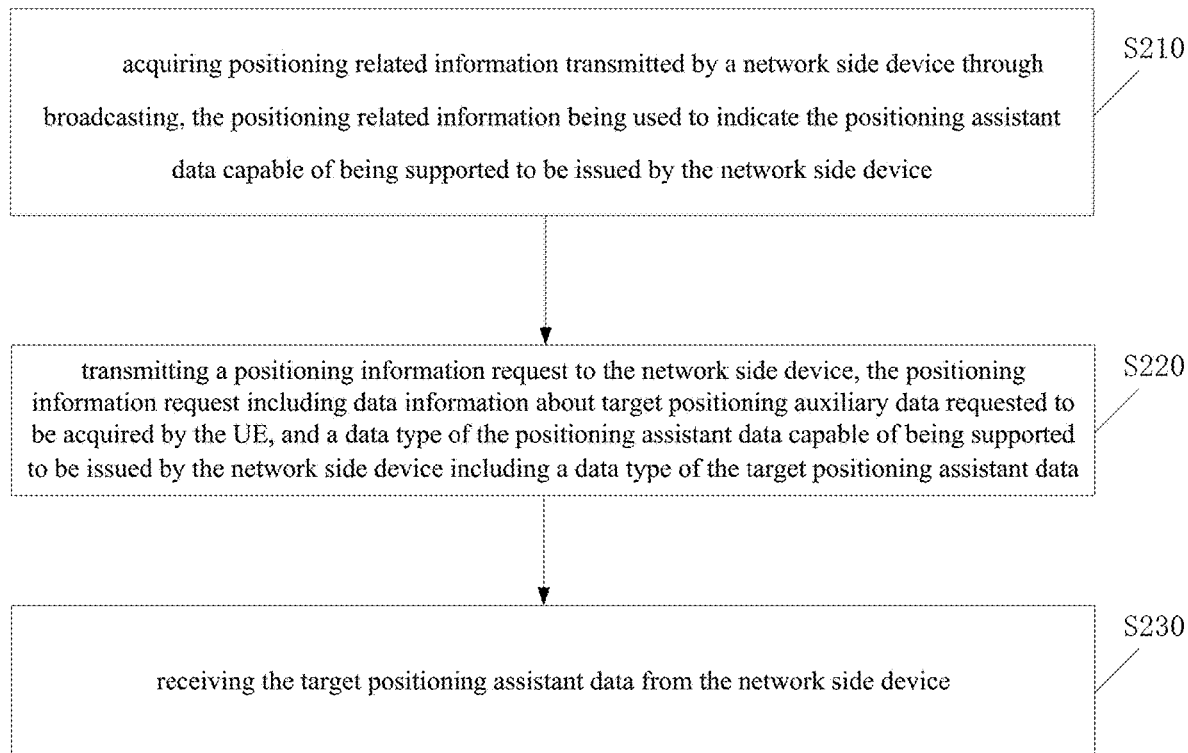
FIG. 2 is a flow chart of a method for acquiring positioning assistant data according to some embodiments of the present disclosure.

As shown in FIG. 2, the present disclosure provides in some embodiments a method for acquiring positioning assistant data for a UE, which includes: S210 of acquiring positioning related information transmitted by a network side device through broadcasting, the positioning related information being used to indicate the positioning assistant data capable of being supported to be issued by the network side device; S220 of transmitting a positioning information request to the network side device, the positioning information request including data information about target positioning assistant data requested to be acquired by the UE, and a data type of the positioning assistant data capable of being supported to be issued by the network side device including a data type of the target positioning assistant data; and S230 of receiving the target positioning assistant data from the network side device.

According to the method in the embodiments of the present disclosure, the network side device may indicate the positioning assistant data capable of being supported to be issued through broadcasting, and the UE in an idle state or inactive state may transmit the request information to the network side device on its own initiative when the UE performs a positioning operation and needs to acquire the positioning assistant data, so as to acquire the desired target positioning assistant data.

In the embodiments of the present disclosure, the network side device may transmit the positioning related information through broadcasting, so as to indicate the positioning assistant data capable of being supported to be issued. In some possible embodiments of the present disclosure, the positioning assistant data capable of being supported to be issued by the network side device may include at least one of: positioning data based on one type of GNSS, e.g., a Global Positioning System (GPS), a Navigation Satellite System (GLONASS), a Galileo system, a Quasi-Zenith Satellite System (QZSS), a BeiDou Navigation Satellite System (BDS), and a Satellite Based Augmentation Systems (SBAS); positioning data based on one type of SBAS systems, e.g., a Wide Area Augmentation System (WAAS), an European Geostationary Navigation Overlay Service (EGNOS), a Multi-Functional Satellite Augmentation System (MSAS) and a GPS-aided GEO Augmented Navigation (GAGAN) system; positioning data based on a future satellite navigation system and a new ground-based augmentation system, e.g., a BDS ground-based augmentation system; and positioning data based on an Observed Time Difference of Arrival (OTDOA).

In the embodiments of the present disclosure, the network side device may transmit type information about the positioning assistant data capable of being supported to be issued to the UE through broadcasting, i.e., transmit a type of the positioning assistant data in all types capable of being supported to be issued to the UE, e.g., indicate the positioning assistant data in a certain type of GNSS and/or indicate the positioning assistant data in a certain type of SBAS.

To be specific, the network side device may transmit the positioning related information through broadcasting, so as to issue the above information to the UE. In addition, the positioning related information may include basic information about the GNSS capable of being supported by the network side device, and the basic information about the GNSS may be used to indicate the positioning assistant data capable of being issued. For example, the basic information may include basic ephemeris and/or time.

Based on the above, subsequent to S210 of acquiring, by the UE, the positioning related information transmitted by the network side device through broadcasting, the method may further include determining the target positioning assistant data in accordance with the positioning assistant data capable of being supported to be issued by the network side device.

The data type of the positioning assistant data capable of being supported to be issued by the network side device may include the data type of the target positioning assistant data, i.e., the data type of the target positioning assistant data determined by the UE shall belong to the data type of the positioning assistant data capable of being issued and indicated in the positioning related information transmitted by the network side device through broadcasting.

To be specific, when the UE has determined that the other type of positioning auxiliary information needs to be additionally transmitted by the network side device in accordance with the type information about the positioning assistant data capable of being supported to be issued from the network side device, a type of the positioning assistant data that has been received and a type of the positioning assistant data supported by the UE itself, the UE may determine the positioning auxiliary information to be additionally transmitted as the target positioning assistant data, and transmit the positioning information request to the network side device in accordance with the determined target positioning assistant data.

For example, when the UE determines that any other type of positioning auxiliary information further needs to be additionally transmitted by the network side device e.g., wide-area difference correction information, in accordance with a type of the GNSS capable of being provided by the network side device, the type of the positioning assistant data that has been received and a type of the GNSS supported by the UE, the UE may transmit the positioning information request to the network side device.

In the embodiments of the present disclosure, in S210 of acquiring the positioning related information transmitted by the network side device through broadcasting, the positioning related information may be further used to indicate a transmission mode of the positioning information request transmitted by the UE to the network side device. In addition, S220 of transmitting the positioning information request to the network side device may include transmitting the positioning information request to the network side device in accordance with the transmission mode indicated in the positioning related information.

To be specific, the positioning related information may include identification information indicating the transmission mode of the positioning information request, and different identification information may be used to indicate different transmission modes adopted by the UE for transmitting the positioning information request.

In a possible embodiment of the present disclosure, the transmission mode may be a mode where the positioning information request is transmitted through an RRC message or preamble.

To be specific, when the transmission mode is a mode where the positioning information request is transmitted through the preamble, the positioning related information may be further used to indicate preambles corresponding to the positioning assistant data of different types.

When the positioning information request is transmitted through the preamble, the UE may request corresponding positioning assistant data from the network side device through dedicated preambles corresponding to the positioning assistant data of different types. To be specific, when transmitting, through broadcasting, the positioning assistant data capable of being supported to be issued, the network side device may indicate the dedicated preambles corresponding to the positioning assistant data of different types. Based on this mode, in S220, when transmitting the positioning information request to the network side device, the UE may differentiate the requested target positioning assistant data of different types from each other through physical layer resources, e.g., different preambles may be used to indicate that the target positioning assistant data of different types is requested to be acquired.

When the positioning information request is transmitted through the RRC message, the UE may request to acquire the target positioning assistant data through carrying type information about the requested target positioning assistant data in an RRC system request message. In other words, in this mode, the positioning information request may be transmitted through RRC system information. For example, the type information about the target positioning assistant data carried in the RRC system request message may include identification information about one type of GNSS (e.g., GPS, GLONASS or BDS), identification information about an SBAS of a wide-area different correction system, or type information about any other positioning method (e.g., OTDOA, or Uplink Time Difference of Arrival (UTDOA)).

In the above-mentioned mode, when the positioning information request is transmitted through the RRC message and the target positioning assistant data requested by the UE is of an OTDOA type, the UE may provide information about a frequency band supported by the UE itself, so as to assist a network to select a measurement target cell for OTDOA. In the case of not providing any frequency band supported by the UE, the network side device may arbitrarily issue information about all neighboring cells, leading to an increase in a signaling overhead of an air interface.

Figure 3:
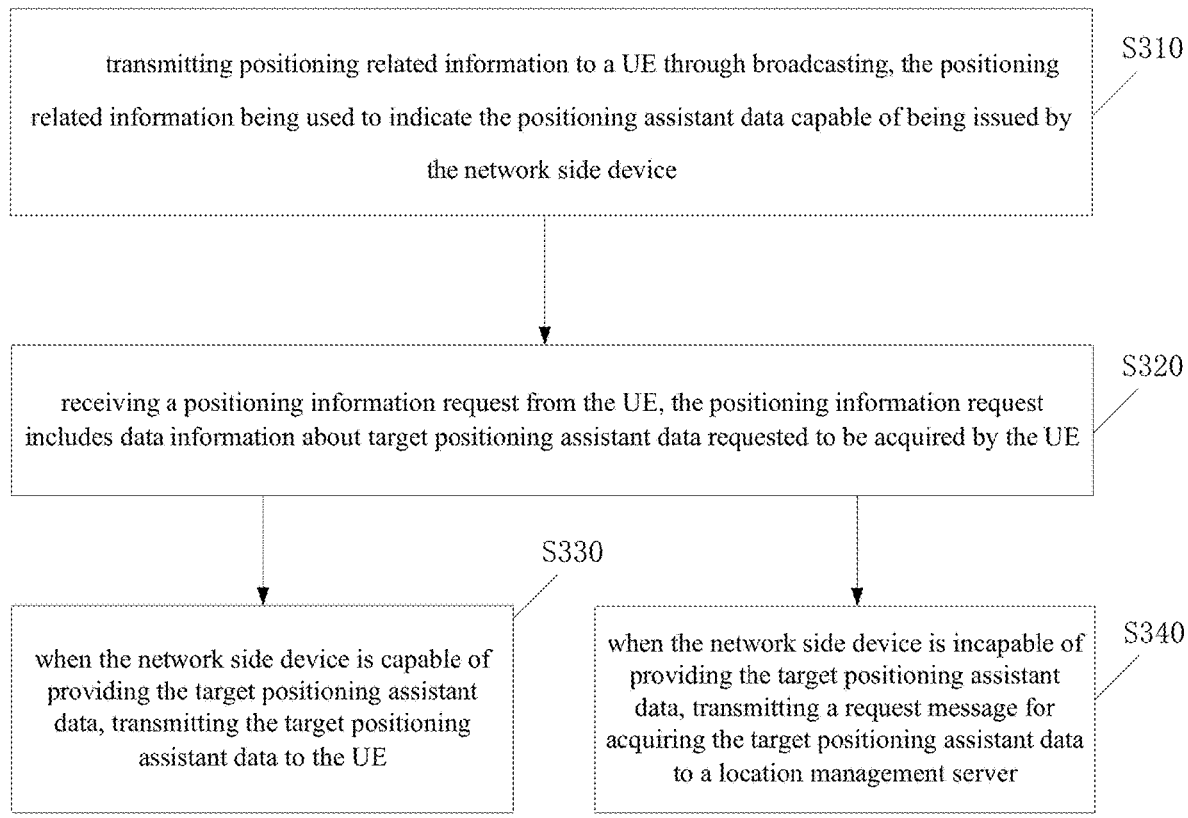
FIG. 3 is a flow chart of a method for providing positioning assistant data according to some embodiments of the present disclosure.

The present disclosure further provides in some embodiments a method for providing positioning assistant data for a network side device which, as shown in FIG. 3, includes: S310 of transmitting positioning related information to a UE through broadcasting, the positioning related information being used to indicate the positioning assistant data capable of being issued by the network side device; S320 of receiving a positioning information request from the UE, the positioning information request includes data information about target positioning assistant data requested to be acquired by the UE; S330 of, when the network side device is capable of providing the target positioning assistant data, transmitting the target positioning assistant data to the UE; and S340 of, when the network side device is incapable of providing the target positioning assistant data, transmitting a request message for acquiring the target positioning assistant data to a location management server.

In the embodiments of the present disclosure, the network side device may transmit the positioning related information through broadcasting, so as to indicate the positioning assistant data capable of being supported to be issued. To be specific, the positioning assistant data capable of being supported to be issued by the network side device may be positioning data based on one type of GNSS, positioning data based on one type of SBAS, or positioning data based on OTDOA.

Based on the above, the network side device may transmit a type of the positioning assistant data in all types capable of being supported to be issued to the UE, e.g., indicate the positioning assistant data in a certain type of GNSS and/or indicate the positioning assistant data in a certain type of SBAS.

To be specific, the network side device may transmit the positioning related information through broadcasting, so as to issue the above information to the UE. In addition, the positioning related information may include basic information about the GNSS capable of being supported by the network side device, and the basic information about the GNSS may be used to indicate the positioning assistant data capable of being issued. For example, the basic information may include basic ephemeris and/or time.

In S310 of transmitting the positioning related information to the UE through broadcasting, the positioning related information may be further used to indicate a transmission mode of the positioning information request transmitted by the UE to the network side device, and S320 of receiving the positioning information request from the UE may include receiving the positioning information request transmitted by the UE to the network side device in accordance with the transmission mode indicated in the positioning related information.

To be specific, the positioning related information may include identification information indicating the transmission mode of the positioning information request, and different identification information may be used to indicate different transmission modes adopted by the UE for transmitting the positioning information request.

The transmission mode may be a mode where the positioning information request is transmitted through an RRC message or preamble.

When the positioning information request is transmitted through the preamble, the UE may request corresponding positioning assistant data from the network side device through dedicated preambles corresponding to the positioning assistant data of different types. To be specific, when transmitting, through broadcasting, the positioning assistant data capable of being supported to be issued, the network side device may indicate the dedicated preambles corresponding to the positioning assistant data of different types. Based on this mode, when transmitting the positioning information request to the network side device, the UE may differentiate the requested target positioning assistant data of different types from each other through physical layer resources, e.g., different preambles may be used to indicate that the target positioning assistant data of different types is requested to be acquired.

When the positioning information request is transmitted through the RRC message, the UE may request to acquire the target positioning assistant data through carrying type information about the requested target positioning assistant data in an RRC system request message. In other words, in this mode, the positioning information request may be transmitted through RRC system information.

In the embodiments of the present disclosure, subsequent to S320 of receiving the positioning information request from the UE, whether the target positioning assistant data requested by the UE is currently stored in the network side device may be determined. When the target positioning assistant data is currently stored in the network side device, i.e., when the target positioning assistant data is capable of being provided by the network side device, the desired target positioning assistant data may be transmitted to the UE. When the target positioning assistant data is incapable of being provided by the network side device, i.e., when the target positioning assistant data is unavailable, has become invalid or is not currently stored in the network side device, the request message for acquiring the target positioning assistant data may be transmitted to the location management server. The location management server may generate the desired positioning target assistant data for the UE and transmit it to the network side device, and then the network side device may transmit the target positioning assistant data acquired from the location management server to the UE through broadcasting.

Based on the above, subsequent to S340, the method may further include: acquiring the target positioning assistant data from the location management server; and transmitting the target positioning assistant data to the UE through broadcasting.

In the embodiments of the present disclosure, in S340 of transmitting the request message for acquiring the target positioning assistant data to the location management server, the request message may include type information about the target positioning assistant data, and the type information may be any type of the GNSS and/or any type of the SBAS as mentioned hereinabove. Further, the request message may be transmitted by the network side device to the location management server through an NRPPa message. The NRPPa message may be a newly-defined message dedicated for requesting the positioning assistant data that needs to be broadcast.

In some possible embodiments of the present disclosure, upon the receipt of the request message, the location management server may provide the desired target positioning assistant data for the UE to the network side device through the NRPPa message.

According to the method in the embodiments of the present disclosure, the network side device may indicate, through broadcasting, the positioning assistant data capable of being supported to be issued, so that the UE may transmit the request for acquiring the positioning assistant data on its own initiative. As a result, it is able to prevent the network side device from transmitting the positioning assistant data continuously, thereby to prevent a waste of resources and reduce a network overhead.

Figure 4:
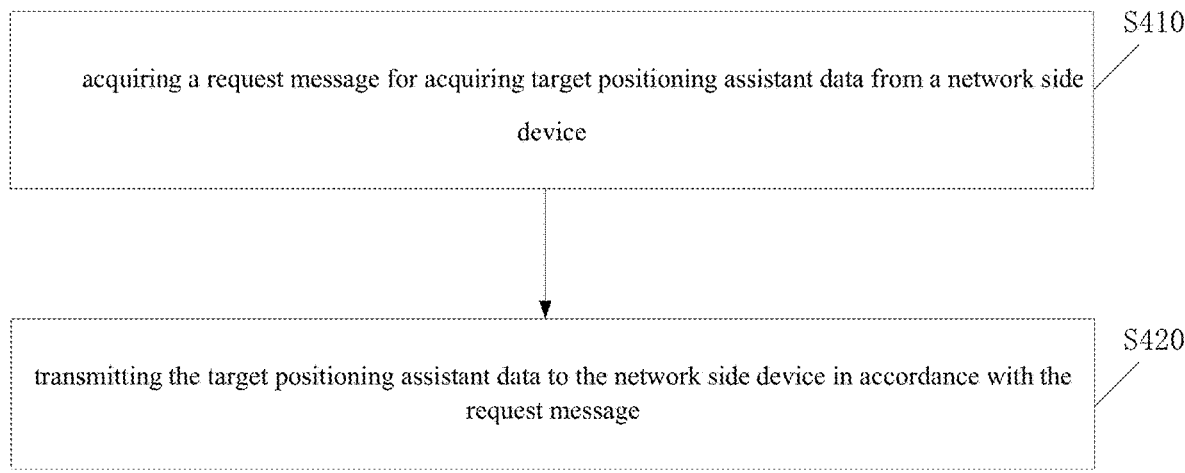
FIG. 4 is a flow chart of another method for providing positioning assistant data according to some embodiments of the present disclosure.

The present disclosure further provides in some embodiments a method for providing positioning assistant data for a location management server which, as shown in FIG. 4, includes: S410 of acquiring a request message for acquiring target positioning assistant data from a network side device; and S420 of transmitting the target positioning assistant data to the network side device in accordance with the request message.

To be specific, S410 of acquiring the request message for acquiring the target positioning assistant data from the network side device may include acquiring the request message transmitted by the network side device through an NRPPa message, and S420 of transmitting the target positioning assistant data to the network side device may include transmitting the target positioning assistant data to the network side device through the NRPPa message.

Based on the above, when the UE transmits the request for acquiring the positioning assistant data on its own initiative, the network side device may transmit the request message to the location management server in accordance with a type of the target positioning assistant data requested by the UE, so that the location management server may provide the desired target positioning assistant data for the UE.

Figure 5:
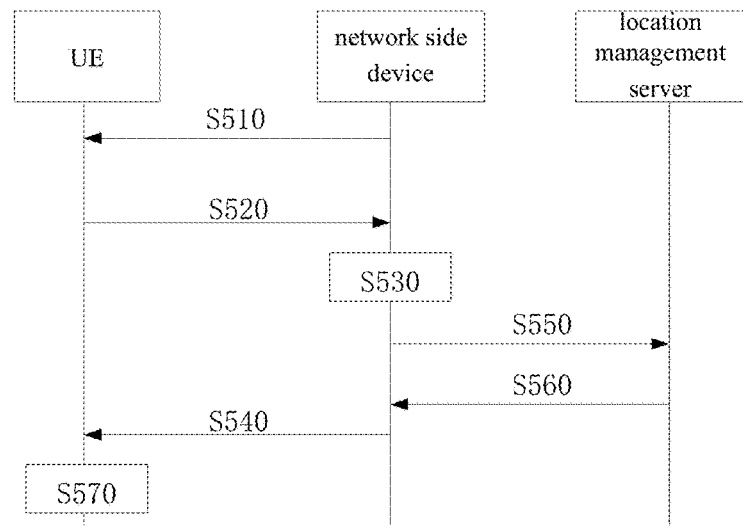
FIG. 5 is a schematic view showing an operating procedure of a communication system according to some embodiments of the present disclosure.

To be specific, as shown in FIG. 5, a procedure of the method executed by a network system consisting of the UE, the network side device and the location management server may include: S510 of transmitting, by the network side device, the positioning related information through broadcasting, the positioning related information being used to indicate the positioning assistant data capable of being supported and the issued by the network side device, i.e., broadcasting a type of the positioning assistant data capable of being supported by the network side device to the UE; S520: when positioning, transmitting, by the UE, the positioning information request to the network side device, the positioning information request including data information about the target positioning assistant data requested to be acquired by the UE; S530 of determining, by the network side device, whether it is capable of providing the target positioning assistant data requested by the UE, if yes, proceeding to S540, and otherwise, proceeding to S550; S540 of transmitting, by the network side device, the desired target positioning assistant data to the UE through broadcasting; S550 of transmitting, by the network side device, the request message for acquiring the target positioning assistant data to the location management server; S560 of transmitting, by the location management server, the target positioning assistant data to the network side device, and performing 540; and S570 of acquiring, by the UE, the target positioning assistant data, and performing a subsequent positioning procedure.

In some possible embodiments of the present disclosure, in S510 of transmitting, by the network side device, the positioning related information through broadcasting, the positioning related information may be further used to indicate the transmission mode of the positioning information request transmitted by the UE, and the transmission mode may be a mode where the positioning information request is transmitted through a preamble. For example, during the transmission of the positioning related information, the positioning related information may be used to indicate an index 55 of a dedicated preamble corresponding GPS assistant data, and an index 56 of a dedicated preamble corresponding to BDS assistant data.

Based on the transmission mode indicated by the network side device in S510, during the positioning, when the UE in an idle or inactive state needs to acquire the BDS positioning assistant data, in S520, the preamble with an index of 56 may be transmitted through an uplink random access resource.

In some possible embodiments of the present disclosure, upon the receipt of information about the preamble, the network side device may transmit a reception acknowledgement message along with a Random Access Response (RAR). Then, in S530, the network side device may determine, in accordance with the index of the preamble, that the BDS assistant data needs to be acquired by the UE, and determine that the network side device is capable of issuing the related information to the UE through broadcasting when valid BDS positioning assistant data has been stored in the network side device. When no valid BDS positioning assistant data is stored in the network side device, the network side device may transmit the assistant data request message to the location management server, and the type information about the requested positioning assistant data, e.g., BDS, may be carried in the request message. Upon the receipt of the request message, the location management server may issue up-to-date valid BDS positioning assistant data (which may be encrypted, depending on a policy of an operator) to the network side device. The network side device may issue the positioning assistant data to the UE in a cell through broadcasting, and the UE may perform a subsequent positioning procedure upon the receipt of the positioning assistant data.

In another possible embodiment of the present disclosure, in S510 of transmitting, by the network side device, the positioning related information through broadcasting, the positioning related information may be further used to indicate the transmission mode of the positioning information request transmitted by the UE, and the transmission mode may be a mode where the positioning related information is transmitted through an RRC message.

For example, in S510, the network side device may broadcast that it is capable of supporting the issuing of the GPS positioning assistant data and the BDS positioning assistant data in the GNSS, and indicate that the request for broadcasting the related positioning assistant data needs to be transmitted through RRC signaling. When the UE fails to receive the desired positioning assistant data, it may transmit the request message carrying the type information about the desired positioning assistant data, e.g. BDS, wide-area difference data or OTDOA, through RRC signaling. Upon the receipt of the request message, when no valid positioning assistant data requested by the UE is stored in the network side device, the network side device may transmit the request message for acquiring the positioning assistant data to the location management server, and the request message may also carry the information about the requested positioning assistant data. Upon the receipt of the request message, the location management server may issue up-to-date valid BDS positioning assistant data (which may be encrypted, depending on a policy of an operator) to the network side device. The network side device may issue the positioning assistant data to the UE in a cell through broadcasting, and the UE may perform a subsequent positioning procedure upon the receipt of the positioning assistant data.

According to the method in the embodiments of the present disclosure, the network side device may broadcast information about the GNSS (e.g., GPS, GLONASS, Galileo, or BDS) and the SBAS (e.g., WAAS or EGNOS) capable of being supported, and the UE may transmit information about the GNSSS and SBAS to be acquired to the network side device. When there is no related positioning assistant data in the network side device, the network side device may transmit the request to the location management server. The location management server may issue the related positioning assistant data to the network side device, and the network side device may broadcast the positioning assistant data to the UE.

Figure 6:
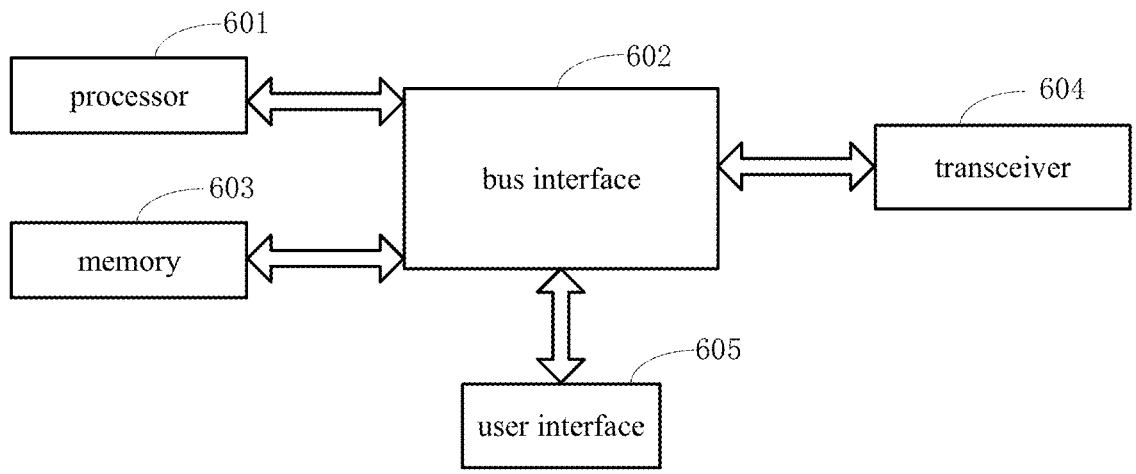
FIG. 6 is schematic view showing a UE according to some embodiments of the present disclosure.

The present disclosure further provides in some embodiments a UE which, as shown in FIG. 6, includes a processor 601, and a memory 603 connected to the processor 601 through a bus interface 602 and configured to store therein programs and data for the operation of the processor 601. The processor 601 is configured to call and execute the programs and data in the memory 603.

A transceiver 604 is connected to the bus interface 602, and configured to receive and transmit data under the control of the processor 601. To be specific, the processor 601 is configured to read the program in the memory 603, so as to: acquire positioning related information transmitted by a network side device through broadcasting, the positioning related information being used to indicate the positioning assistant data capable of being supported to be issued by the network side device; transmit a positioning information request to the network side device, the positioning information request including data information about target positioning assistant data requested to be acquired by the UE, and a data type of the positioning assistant data capable of being supported to be issued by the network side device including a data type of the target positioning assistant data; and receive the target positioning assistant data from the network side device.

In some possible embodiments of the present disclosure, the processor 601 is further configured to determine the target positioning assistant data in accordance with the positioning assistant data capable of being supported to be issued by the network side device.

In some possible embodiments of the present disclosure, the positioning related information may include basic information about a GNSS capable of being supported by the network side device, and the basic information about the GNSS may be used to indicate the positioning assistant data capable of being issued.

In some possible embodiments of the present disclosure, the positioning related information may be further used to indicate a transmission mode of the positioning information request transmitted by the UE to the network side device, and the processor 601 is further configured to transmit the positioning information request to the network side device in accordance with the transmission mode indicated in the positioning related information.

In some possible embodiments of the present disclosure, the transmission mode may be a mode where the positioning information request is transmitted through an RRC message or preamble.

In some possible embodiments of the present disclosure, when the transmission mode is a mode where the positioning information request is transmitted through the preamble, the positioning related information may be further used to indicate preambles corresponding to the positioning assistant data of different types.

It should be appreciated that, in FIG. 6, bus architecture may include a number of buses and bridges connected to each other, so as to connect various circuits for one or more processors 601 and one or more memories 603. In addition, as is known in the art, the bus architecture may be used to connect any other circuits, such as a circuit for a peripheral device, a circuit for a voltage stabilizer and a power management circuit. The bus interface may be provided, and the transceiver 604 may consist of a plurality of elements, i.e., a transmitter and a receiver for communication with any other devices over a transmission medium. With respect to different UEs, a user interface 605 may also be provided for devices which are to be arranged inside or outside the UE, and these devices may include but not limited to a keypad, a display, a speaker, a microphone and a joystick. The processor 601 may take charge of managing the bus architecture as well as general processings. The memory 603 may store therein data for the operation of the processor 601.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

Figure 7:
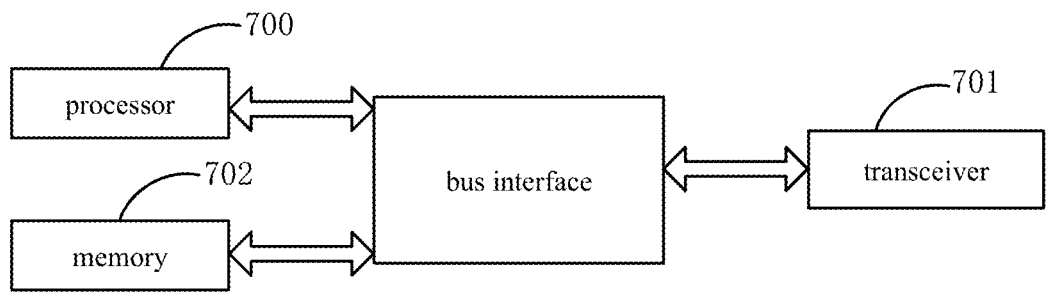
FIG. 7 is a schematic view showing a network side device according to some embodiments of the present disclosure.

The present disclosure further provides in some embodiments a network side device which, as shown in FIG. 7, includes a transceiver 701, a memory 702, a processor 700, and a computer program stored in the memory 702 and executed by the processor 700. The processor 700 is configured to call and execute the computer program in the memory 702.

The transceiver 701 is configured to receive and transmit data under the control of the processor 700. To be specific, the processor 700 is configured to read the program in the memory 702, so as to: transmit positioning related information to a UE through broadcasting, the positioning related information being used to indicate the positioning assistant data capable of being issued by the network side device; receive a positioning information request from the UE, the positioning information request includes data information about target positioning assistant data requested to be acquired by the UE; when the network side device is capable of providing the target positioning assistant data, transmit the target positioning assistant data to the UE; and when the network side device is incapable of providing the target positioning assistant data, transmit a request message for acquiring the target positioning assistant data to a location management server.

In some possible embodiments of the present disclosure, the processor 700 is further configured to: acquire the target positioning assistant data from the location management server; and transmit the target positioning assistant data to the UE through broadcasting.

In some possible embodiments of the present disclosure, the positioning related information may include basic information about a GNSS capable of being supported by the network side device, and the basic information about the GNSS may be used to indicate the positioning assistant data capable of being issued.

In some possible embodiments of the present disclosure, when the positioning related information is transmitted by the processor to the UE through broadcasting, the positioning related information may be further used to indicate a transmission mode of the positioning information request transmitted by the UE to the network side device, and the processor 700 is further configured to receive the positioning information request transmitted by the UE to the network side device in accordance with the transmission mode indicated in the positioning related information.

In some possible embodiments of the present disclosure, the transmission mode may be a mode where the positioning information request is transmitted through an RRC message or preamble.

In some possible embodiments of the present disclosure, when the transmission mode is a mode where the positioning information request is transmitted through the preamble, the positioning related information may be further used to indicate preambles corresponding to the positioning assistant data of different types.

In some possible embodiments of the present disclosure, the processor 700 is further configured to transmit the request message to the location management server through an NRPPa message.

In FIG. 7, bus architecture may include a number of buses and bridges connected to each other, so as to connect various circuits for one or more processors 700 and one or more memories 702. In addition, as is known in the art, the bus architecture may be used to connect any other circuits, such as a circuit for a peripheral device, a circuit for a voltage stabilizer and a power management circuit. The bus interface may be provided, and the transceiver 701 may consist of a plurality of elements, i.e., a transmitter and a receiver for communication with any other devices over a transmission medium. The processor 700 may take charge of managing the bus architecture as well as general processings. The memory 702 may store therein data for the operation of the processor 700.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

Figure 8:
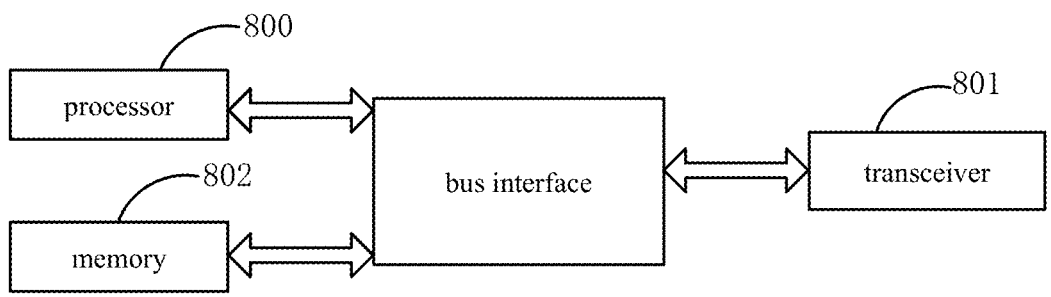
FIG. 8 is a schematic view showing a location management server according to some embodiments of the present disclosure.

The present disclosure further provides in some embodiments a location management server which, as shown in FIG. 8, includes a transceiver 801, a memory 802, a processor 800, and a computer program stored in the memory 802 and executed by the processor 800. The processor 800 is configured to call and execute the computer program in the memory 802.

The transceiver 801 is configured to receive and transmit data under the control of the processor 800. To be specific, the processor 800 is configured to read the program in the memory 802, so as to: acquire a request message for acquiring target positioning assistant data from a network side device; and transmit the target positioning assistant data to the network side device in accordance with the request message.

In some possible embodiments of the present disclosure, the processor 802 is further configured to acquire the request message transmitted by the network side device through an NRPPa message, and when transmitting the target positioning assistant data to the network side device, the processor 800 is further configured to transmit the target positioning assistant data to the network side device through the NRPPa message.

In FIG. 8, bus architecture may include a number of buses and bridges connected to each other, so as to connect various circuits for one or more processors 800 and one or more memories 802. In addition, as is known in the art, the bus architecture may be used to connect any other circuits, such as a circuit for a peripheral device, a circuit for a voltage stabilizer and a power management circuit. A bus interface may be provided, and the transceiver 801 may consist of a plurality of elements, i.e., a transmitter and a receiver for communication with any other devices over a transmission medium. The processor 800 may take charge of managing the bus architecture as well as general processings. The memory 802 may store therein data for the operation of the processor 800.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

Figure 9:
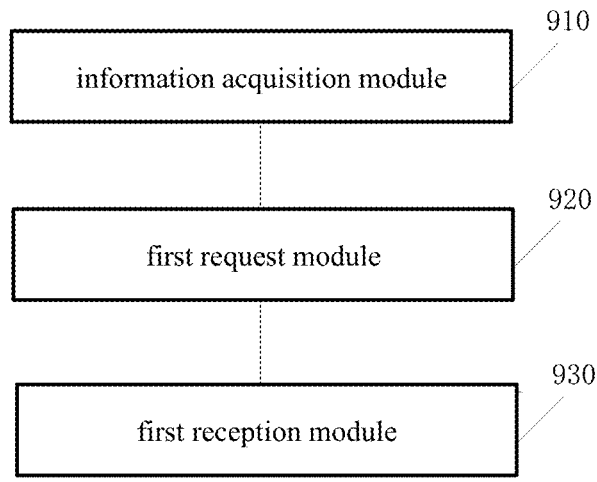
FIG. 9 is a schematic view showing an apparatus for acquiring positioning assistant data according to some embodiments of the present disclosure.

The present disclosure further provides in some embodiments an apparatus for acquiring positioning assistant data for a UE which, as shown in FIG. 9, includes: an information acquisition module 910 configured to acquire positioning related information transmitted by a network side device through broadcasting, the positioning related information being used to indicate the positioning assistant data capable of being supported to be issued by the network side device; a first request module 920 configured to transmit a positioning information request to the network side device, the positioning information request including data information about target positioning assistant data requested to be acquired by the UE, and a data type of the positioning assistant data capable of being supported to be issued by the network side device including a data type of the target positioning assistant data; and a first reception module 930 configured to receive the target positioning assistant data from the network side device.

In some possible embodiments of the present disclosure, the first request module 920 is further configured to determine the target positioning assistant data in accordance with the positioning assistant data capable of being supported to be issued by the network side device.

In some possible embodiments of the present disclosure, the positioning related information may include basic information about a GNSS capable of being supported by the network side device, and the basic information about the GNSS may be used to indicate the positioning assistant data capable of being issued.

In some possible embodiments of the present disclosure, the positioning related information may be further used to indicate a transmission mode of the positioning information request transmitted by the UE to the network side device, and the first request module 920 is further configured to transmit the positioning information request to the network side device in accordance with the transmission mode indicated in the positioning related information.

In some possible embodiments of the present disclosure, the transmission mode may be a mode where the positioning information request is transmitted through an RRC message or preamble.

In some possible embodiments of the present disclosure, when the transmission mode is a mode where the positioning information request is transmitted through the preamble, the positioning related information may be further used to indicate preambles corresponding to the positioning assistant data of different types.

Figure 10:
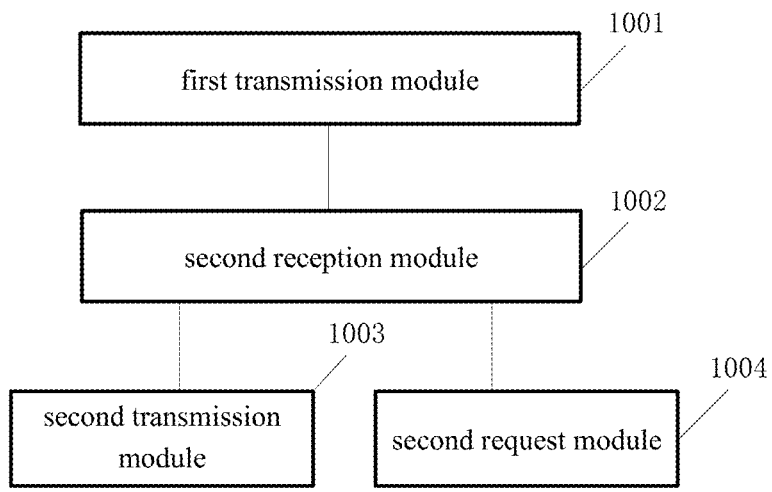
FIG. 10 is a schematic view showing an apparatus for providing positioning assistant data according to some embodiments of the present disclosure.

The present disclosure further provides in some embodiments an apparatus for providing positioning assistant data for a network side device which, as shown in FIG. 10, includes: a first transmission module 1001 configured to transmit positioning related information to a UE through broadcasting, the positioning related information being used to indicate the positioning assistant data capable of being issued by the network side device; a second reception module 1002 configured to receive a positioning information request from the UE, the positioning information request includes data information about target positioning assistant data requested to be acquired by the UE; a second transmission module 1003 configured to, when the network side device is capable of providing the target positioning assistant data, transmit the target positioning assistant data to the UE; and a second request module 1004 configured to, when the network side device is incapable of providing the target positioning assistant data, transmit a request message for acquiring the target positioning assistant data to a location management server.

In some possible embodiments of the present disclosure, the second request module 1004 is further configured to: acquire the target positioning assistant data from the location management server; and transmit the target positioning assistant data to the UE through broadcasting.

In some possible embodiments of the present disclosure, the positioning related information may include basic information about a GNSS capable of being supported by the network side device, and the basic information about the GNSS may be used to indicate the positioning assistant data capable of being issued.

In some possible embodiments of the present disclosure, when the positioning related information is transmitted by the first transmission module 1001 to the UE through broadcasting, the positioning related information may be further used to indicate a transmission mode of the positioning information request transmitted by the UE to the network side device, and the second reception module 1002 is further configured to receive the positioning information request transmitted by the UE to the network side device in accordance with the transmission mode indicated in the positioning related information.

In some possible embodiments of the present disclosure, the transmission mode may be a mode where the positioning information request is transmitted through an RRC message or preamble.

In some possible embodiments of the present disclosure, when the transmission mode is a mode where the positioning information request is transmitted through the preamble, the positioning related information may be further used to indicate preambles corresponding to the positioning assistant data of different types.

In some possible embodiments of the present disclosure, the second request module 1004 is further configured to transmit the request message to the location management server through an NRPPa message.

Figure 11:
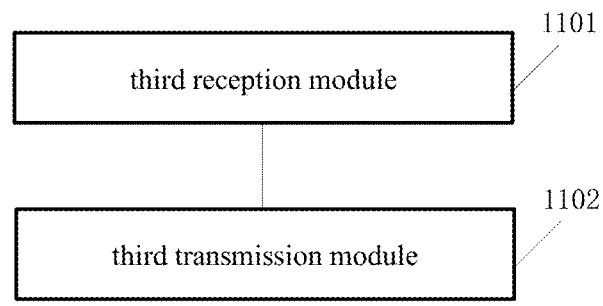
FIG. 11 is a schematic view showing another apparatus for providing positioning assistant data according to some embodiments of the present disclosure.

The present disclosure further provides in some embodiments an apparatus for providing positioning assistant data for a location management server which, as shown in FIG. 11, includes: a third reception module 1101 configured to receive a request message for acquiring target positioning assistant data from a network side device; and a third transmission module 1102 configured to transmit the target positioning assistant data to the network side device in accordance with the request message.

In some possible embodiments of the present disclosure, the third reception module 1101 is further configured to acquire the request message transmitted by the network side device through an NRPPa message, and when transmitting the target positioning assistant data to the network side device, the third transmission module 1102 is further configured to transmit the target positioning assistant data to the network side device through the NRPPa message.

The present disclosure further provides in some embodiments a computer-readable storage medium storing therein a computer program. The computer program is executed by a processor, so as to implement the above-mentioned method for acquiring the positioning assistant data or the above-mentioned method for providing the positioning assistant data with a same technical effect, which will not be particularly defined herein. The computer-readable storage medium may be, e.g., a read-only memory (Read-Only Memory, ROM), a random access memory (Random Access Memory, RAM), a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The description has been given hereinabove in conjunction with the drawings and the embodiments, but the present disclosure shall not be limited to the above preferred embodiments. These embodiments are for illustrative purposes only, but shall not be used to limit the scope of the present disclosure. A person skilled in the art may make various alternations or modifications without departing from the spirit of the present disclosure and the scope defined in the appended claims, which also fall within the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for acquiring positioning assistant data performed by a User Equipment (UE), the method comprising:
    acquiring positioning related information transmitted by a network side device through broadcasting, the positioning related information being used to indicate which positioning assistant datum or positioning assistant data among a plurality of candidate positioning assistant data capable of being transmitted by the network side device;
    transmitting a positioning information request to the network side device, wherein the positioning information request comprises data information about target positioning assistant data requested to be acquired by the UE, and wherein data types of the plurality of candidate positioning assistant data capable of being transmitted by the network side device comprise a data type of the target positioning assistant data; and
    receiving the target positioning assistant data from the network side device,
    wherein the plurality of candidate positioning assistant data capable of being transmitted by the network side device comprises at least one of:
    positioning data based on one type of Global Navigation Satellite System (GNSS);
    positioning data based on one type of Satellite Based Augmentation Systems (SBAS) systems;
    BeiDou Navigation Satellite System (BDS) ground-based augmentation system; or
    positioning data based on an Observed Time Difference of Arrival (OTDOA).

2. The method according to claim 1, wherein subsequent to acquiring the positioning related information transmitted by the network side device through broadcasting, the method further comprises:
    determining the target positioning assistant data in accordance with the plurality of candidate positioning assistant data capable of being transmitted by the network side device.

3. The method according to claim 1, wherein the positioning related information comprises basic information about the GNSS capable of being supported by the network side device, and the basic information about the GNSS is used to indicate which positioning assistant datum or positioning assistant data among a plurality of candidate positioning assistant data capable of being transmitted by the network side device; and
    the basic information comprises related information about navigation.

4. The method according to claim 1, wherein in the course of the acquiring the positioning related information transmitted by the network side device through broadcasting, the positioning related information is further used to indicate a transmission mode of the positioning information request transmitted by the UE to the network side device; and
   the transmitting the positioning information request to the network side device comprises transmitting the positioning information request to the network side device in accordance with the transmission mode indicated in the positioning related information.

5. The method according to claim 4, wherein the transmission mode is a mode where the positioning information request is transmitted through a Radio Resource Control (RRC) message or preamble.

6. The method according to claim 5, wherein when the transmission mode is a mode where the positioning information request is transmitted through the preamble, the positioning related information is further used to indicate preambles corresponding to the positioning assistant data of different types.

7. The method according to claim 1, wherein
   when the network side device is capable of providing the target positioning assistant data, the network side device transmits the target positioning assistant data to the UE; or
   when the network side device is incapable of providing the target positioning assistant data, the network side device transmits a request message for acquiring the target positioning assistant data to a location management server.

8. The method according to claim 7, wherein
   the network side device acquires the target positioning assistant data from the location management server; and
   the network side device transmits the target positioning assistant data to the UE through broadcasting.

9. The method according to claim 7, wherein in the course of the transmitting the positioning related information to the UE through broadcasting, the positioning related information is further used to indicate a transmission mode of the positioning information request transmitted by the UE to the network side device; and
   the network side device receives the positioning information request transmitted by the UE in accordance with the transmission mode indicated in the positioning related information.

10. The method according to claim 9, wherein the transmission mode is a mode where the positioning information request is transmitted through an RRC message or preamble.

11. The method according to claim 10, wherein when the transmission mode is a mode where the positioning information request is transmitted through the preamble, the positioning related information is further used to indicate preambles corresponding to the positioning assistant data of different types.

12. The method according to claim 7, wherein
   the network side device transmits the request message to the location management server through a New Radio Positioning Protocol Annex (NRPPa) message.

13. The method according to claim 7, wherein
   the location management server acquires the request message for acquiring the target positioning assistant data from the network side device; and
   the location management server transmits the target positioning assistant data to the network side device in accordance with the request message.

14. The method according to claim 13, wherein the location management server acquires the request message transmitted by the network side device through the NRPPa message; and
   the location management server transmits the target positioning assistant data to the network side device through the NRPPa message.

15. A User Equipment (UE), comprising a memory, a processor, and a program stored in the memory and executed by the processor, wherein the processor is configured to execute the program so as to implement the following operations:
   acquiring positioning related information transmitted by a network side device through broadcasting, the positioning related information being used to indicate which positioning assistant datum or positioning assistant data among a plurality of candidate positioning assistant data capable of being transmitted by the network side device;
   transmitting a positioning information request to the network side device, wherein the positioning information request comprises data information about target positioning assistant data requested to be acquired by the UE, and wherein data types of the plurality of candidate positioning assistant data capable of being transmitted by the network side device comprise a data type of the target positioning assistant data; and
   receiving the target positioning assistant data from the network side device,
   wherein the plurality of candidate positioning assistant data capable of being transmitted by the network side device comprises at least one of:
   positioning data based on one type of Global Navigation Satellite System (GNSS);
   positioning data based on one type of Satellite Based Augmentation Systems (SBAS) systems;
   BeiDou Navigation Satellite System (BDS) ground-based augmentation system; or
   positioning data based on an Observed Time Difference of Arrival (OTDOA).

16. The UE according to claim 15, wherein subsequent to acquiring the positioning related information transmitted by the network side device through broadcasting, the operations further comprises:
   determining the target positioning assistant data in accordance with the plurality of candidate positioning assistant data capable of being transmitted by the network side device.

17. The UE according to claim 15, wherein the positioning related information comprises basic information about the GNSS capable of being supported by the network side device, and the basic information about the GNSS is used to indicate which positioning assistant datum or positioning assistant data among a plurality of candidate positioning assistant data capable of being transmitted by the network side device; and
   the basic information comprises related information about navigation.

18. A non-transitory computer-readable storage medium storing therein a program, wherein the program is executed by a processor of a User Equipment (UE), so as to implement the following operations:
   acquiring positioning related information transmitted by a network side device through broadcasting, the positioning related information being used to indicate which positioning assistant datum or positioning assistant data among a plurality of candidate positioning assistant data capable of being transmitted by the network side device;
   transmitting a positioning information request to the network side device, wherein the positioning information request comprises data information about target positioning assistant data requested to be acquired by the UE, and wherein data types of the plurality of candidate positioning assistant data capable of being transmitted by the network side device comprise a data type of the target positioning assistant data; and receiving the target positioning assistant data from the network side device, wherein the plurality of candidate positioning assistant data capable of being transmitted by the network side device comprises at least one of:

positioning data based on one type of Global Navigation Satellite System (GNSS);

positioning data based on one type of Satellite Based Augmentation Systems (SBAS) systems;

BeiDou Navigation Satellite System (BDS) ground-based augmentation system; or positioning data based on an Observed Time Difference of Arrival (OTDOA).

19. The non-transitory computer-readable storage medium according to claim 18, wherein subsequent to acquiring the positioning related information transmitted by the network side device through broadcasting, the operations further comprises:

determining the target positioning assistant data in accordance with the plurality of candidate positioning assistant data capable of being transmitted by the network side device.

20. The non-transitory computer-readable storage medium according to claim 18, wherein the positioning related information comprises basic information about the GNSS capable of being supported by the network side device, and the basic information about the GNSS is used to indicate which positioning assistant datum or positioning assistant data among a plurality of candidate positioning assistant data capable of being transmitted by the network side device; and the basic information comprises related information about navigation.

* * * * *